(12) United States Patent
Miette et al.

(10) Patent No.: US 9,919,346 B2
(45) Date of Patent: Mar. 20, 2018

(54) APPARATUS FOR ASSISTING IN MANUALLY MERGING POSTAL ARTICLES WITH A STACK OF MAILPIECES

(71) Applicant: SOLYSTIC, Bagneux (FR)

(72) Inventors: Emmanuel Miette, Saint Gratien (FR); Bruno Volta, Gif sur Yvette (FR)

(73) Assignee: SOLYSTIC, Bagneux (FR)

( * ) Notice: Subject to any disclaimer, the term of this patent is extended or adjusted under 35 U.S.C. 154(b) by 28 days.

(21) Appl. No.: 15/278,578

(22) Filed: Sep. 28, 2016

(65) Prior Publication Data

US 2017/0014869 A1  Jan. 19, 2017

Related U.S. Application Data

(63) Continuation of application No. PCT/FR2016/051286, filed on May 30, 2016.

(30) Foreign Application Priority Data

Jun. 17, 2015  (FR) .................................... 15 55534

(51) Int. Cl.
| | |
|---|---|
| *G06K 9/00* | (2006.01) |
| *B07C 7/00* | (2006.01) |
| *H04N 5/225* | (2006.01) |
| *H04N 5/247* | (2006.01) |
| *G09F 15/00* | (2006.01) |
| *B42D 15/00* | (2006.01) |

(52) U.S. Cl.
CPC .......... *B07C 7/005* (2013.01); *H04N 5/2251* (2013.01); *H04N 5/247* (2013.01); *B07C 2301/0083* (2013.01)

(58) Field of Classification Search
CPC ............. H04N 5/00; G07B 17/00; B07C 7/00
USPC .......................................................... 382/101
See application file for complete search history.

(56) References Cited

U.S. PATENT DOCUMENTS 9,463,492 B2 * 10/2016 Roch ...................... B65H 39/02

FOREIGN PATENT DOCUMENTS

| DE | 102010043389 A1 | 5/2012 |
|---|---|---|
| WO | 2014087069 A1 | 6/2014 |

OTHER PUBLICATIONS

International Search Report in corresponding International Patent Application No. PCT/FR2016/051286, dated Sep. 9, 2016, with English Translation.
French Search Report in corresponding French Patent Application No. 1555534, dated Apr. 12, 2016.

* cited by examiner

*Primary Examiner* — Abolfazl Tabatabai
(74) *Attorney, Agent, or Firm* — Edell, Shapiro & Finnan, LLC

(57) ABSTRACT

Apparatus for assisting in merging postal articles with a stack of mailpieces that have already been sorted into a certain sequence, said apparatus comprising a merge table suitable for storing the stack of mailpieces on edge, a first camera suitable for forming a digital image of a current postal article to be merged with the stack of mailpieces, a second camera that observes the stack of mailpieces in the manner of an operator placed at one end of the merge table, and a monitoring and control unit with a display screen that is placed at the end of the merge table.

6 Claims, 1 Drawing Sheet

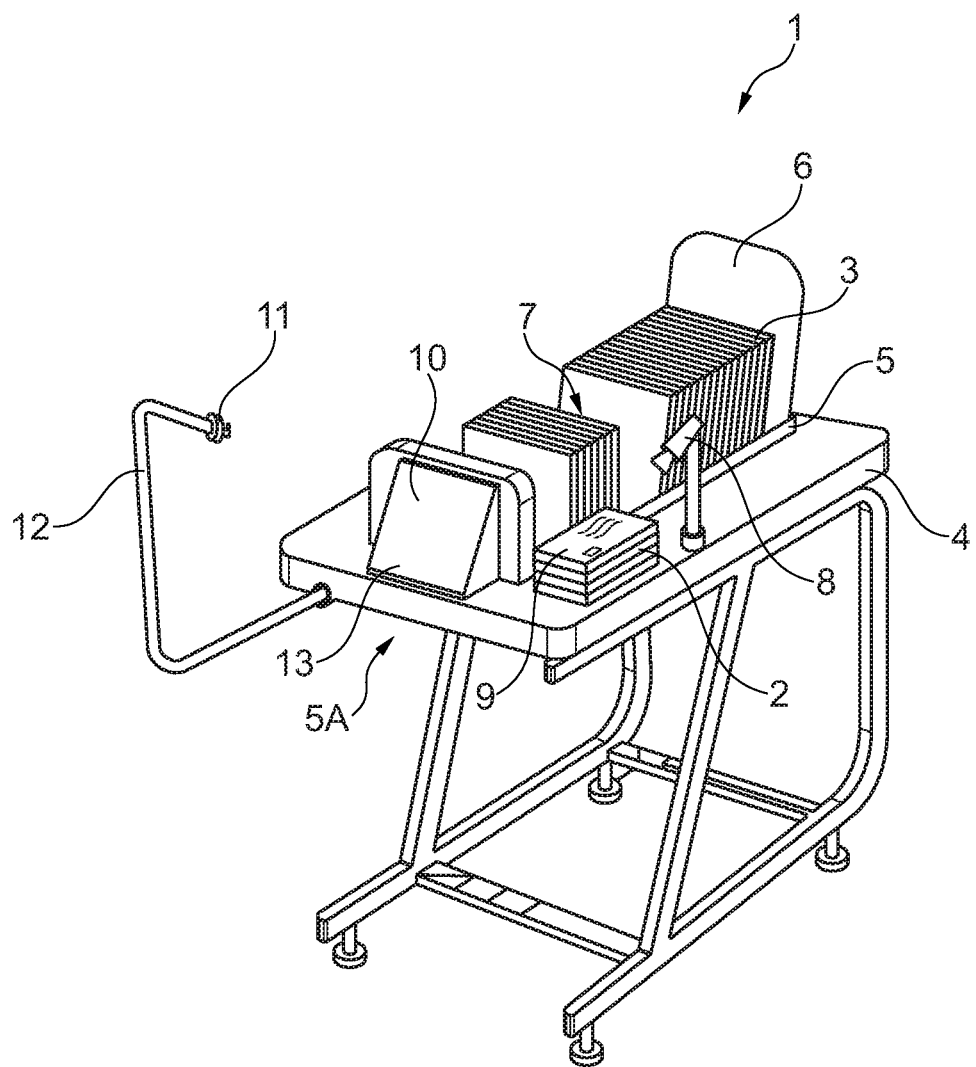

APPARATUS FOR ASSISTING IN MANUALLY MERGING POSTAL ARTICLES WITH A STACK OF MAILPIECES

CROSS REFERENCE TO RELATED APPLICATIONS

This application is a continuation of International Application No. PCT/FR2016/051286, filed May 30, 2016, which claims priority under 35 U.S.C. § 119 to Application No. FR 1555534 filed on Jun. 17, 2015, the entire contents of which are hereby incorporated by reference.

FIELD OF THE INVENTION

The invention relates to the field of postal sorting. The invention relates more particularly to apparatus for assisting in merging postal articles with mailpieces that have already been machine-sorted into a certain sequence, e.g. for delivery on a delivery round or "postman's walk".

Such postal articles are, particularly but not exclusively, non-machine-sortable postal articles, i.e. postal articles that cannot currently be sorted automatically in sorting machines.

BACKGROUND

Postal sorting machines and methods used for preparing delivery rounds can be fully automatic, or else they can include steps in which it is necessary for an operator to intervene, in particular for handling non-machine-sortable postal articles.

On that subject, a method is already known from Patent Document WO 2014/087069 for merging a postal article with sorted mail. In that method, assistance is provided by visually designating the location at which the postal article should be inserted into the stack.

A method is also already known from Patent Document DE 10 2010 043 389 for merging non-machine-sortable postal articles with machine-sorted mail. In that known method, merging assistance is given to the operator in charge of performing the merging. That operator assistance consists in displaying on a display screen placed next to the operator the image of a reference mailpiece that should precede or that should follow the postal article to be merged, in the ordered sequence of the mailpieces.

Then the operator scans through the sequence of mailpieces until said operator visually identifies the reference mailpiece, whereupon said operator can insert the postal article at the right place in the ordered sequence of the mailpieces.

That type of manual merging in preparing the delivery round needs equipment that does not satisfy current requirements for reducing costs, time, and work space.

SUMMARY

An object of the invention is therefore to remedy those drawbacks.

The basic idea of the invention consists more particularly in providing the operator with apparatus for assisting in merging that is simpler to use and that is more ergonomic.

To this end, the invention provides apparatus for assisting in merging postal articles with a stack of mailpieces that have already been sorted into a certain sequence, said apparatus comprising a merge table extending longitudinally between two ends and suitable for storing the stack of mailpieces on edge between said ends, a first camera suitable for forming a digital image of a current postal article to be merged with the stack of mailpieces, and a monitoring and control unit with a display screen and suitable for displaying on the screen an indication representative of an insertion position at which the current postal article is to be inserted into the stack of mailpieces, wherein the display screen is disposed at an end of the merge table at the head of the sequence of mailpieces in a stack and on edge, so that the longitudinally extending stack of mailpieces lies within the field of vision of an operator facing the screen, and wherein said apparatus further comprises a second camera that is suitable for forming a digital image of the stack of mailpieces seen from the same viewing angle as the viewing angle from which the operator sees it, and wherein the monitoring and control unit is arranged to display on the display screen the image of the stack of mailpieces that is formed by said second camera, with a marker designating said insertion position on the image of the stack of mailpieces.

The apparatus of the invention may advantageously have the following features:
said second camera is fastened to said end of the merge table facing the screen and behind the operator in such a manner as to form the digital image of the stack of mailpieces from the same viewing angle as the viewing angle from which the operator sees said stack and without having the operator in its field of vision;
said second camera is integrated into augmented reality glasses designed to be worn by the operator;
the first camera, which is suitable for forming digital images of the current postal article to be merged is mounted at some height on a support fastened to a longitudinal side of the merge table.

BRIEF DESCRIPTION OF THE DRAWINGS

The present invention can be better understood and other advantages appear on reading the following description and on examining the accompanying drawing, in which:

FIG. 1 is a diagrammatic view of apparatus of the invention for assisting in merging.

DETAILED DESCRIPTION

FIG. 1 is a highly diagrammatic view of apparatus 1 for assisting in merging postal articles 2 that are, in particular non-machine-sortable postal articles, such as small parcels or the like.

These articles 2 are to be merged into a stack of mailpieces 3 that have already been sorted into a certain sorting order, e.g. into the sequence of a delivery round.

For example, the mailpieces 3 are letters, magazines, or other flat postal articles that are machine-sortable, i.e. that can be sorted automatically in a postal sorting machine, as is well known to the person skilled in the art.

The apparatus 1 for assisting in merging is, in this example, in the form of a cart mounted on skids. Without restricting the scope of the invention, the apparatus of the invention may be mounted on any appropriate type of support that may be movable or non-movable.

On its top portion 4, the cart has a merge table 5.

The merge table 5 extends longitudinally between two ends and is suitable for storing the stack of mailpieces 3 in sequence and on edge between said ends.

In this example, the merge table has a paddle 6 that serves as a bearing face for the back of the stack of mailpieces. The paddle may be inclined and mounted between the two ends of the merge table both so as to facilitate forming an insertion slot at which to insert an article 2 into the stack of mailpieces 3, and also so as to be moved as the articles 2 are merged with the stack.

The apparatus 1 also includes a first camera 8 suitable for forming a digital image of a current postal article 9 to be merged with the stack of mailpieces 3. In this example, said postal article to be merged is laid flat on one side of the merge table 4.

This camera 8 is fastened at some height, thereby making it possible to place a stack of postal articles 2 to be merged under said camera 8.

A display screen 10 is also disposed at the end 5A of the merge table 5 that coincides with the head of the sequence of the stack of mailpieces 3.

Said screen serves to display for the operator, an indication that is representative of an insertion position at which a current article 2 to be merged is to be inserted into the stack of mailpieces 3.

The operator, who is, for example, sitting at the end 5A of the merge table, is facing the screen 10 and thus the stack of mailpieces 3 extending longitudinally along the length of merge table lies within the operator's field of vision.

The apparatus of the invention also includes a second camera 11 that is positioned to form a digital image of the stack of mailpieces 3 seen from the same viewing angle as the viewing angle from which the operator sees it.

In the example shown in FIG. 1, the second camera 11 is placed at the end of a bent arm 12 that is fastened to the end 5A of the merge table.

This bent arm 12 can be arranged in such a manner as to observe the stack of mailpieces 3 over the operator's shoulder. Thus, the second camera 11 is suitable for forming a digital image of the stack of mailpieces 3 without having the operator in its field of vision even though the operator is in front of the screen 10 and facing the stack of mailpieces.

The apparatus 1 for assisting in merging also includes a monitoring and control unit 13 that, for example, is integrated into the screen 10, which may, in addition, be a touch screen. The monitoring and control unit 13 is suitable for storing in a memory sorting data for the sequence of mailpieces that have already been sorted. The monitoring and control unit is connected to the cameras 8 and 11 so as to retrieve the image of a postal article to be merged and so as to recognize its postal address. On the basis of said postal address, the monitoring and control unit 13 determines an insertion location at which said postal article is to be inserted into the sequence of mailpieces and displays on the screen the image of the stack of mailpieces 3 as seen by the operator with a visual marker designating said insertion location. The marker may, for example, be an arrow or a representation of an insertion slot 7 in the stack of mailpieces.

On the display screen 10, the unit 13 may also display an indication representative of the insertion position in the form of a number that indicates to the operator the number of mailpieces to scan through manually starting from the head of the sequence in order to reach the position of the insertion slot.

On the display screen 10, the unit 13 may also display an image of the mailpiece situated immediately downstream from the insertion position, thereby enabling the visual checking to be further improved for the operator.

In a variant embodiment of the invention, the second camera 11 may be integrated into augmented reality glasses designed to be worn by the operator.

The apparatus 1 of the invention may be used in the following manner.

The operator places on the merge table a stack of mailpieces 3 that are on edge and in sequence, as shown in FIG. 1.

The operator places a small stack of postal articles 2 flat on one side of the merge table.

The operator sits at the end 5A of the merge table.

The operator takes the postal articles 2 to be merged one-by-one. Each time, an image is taken of the current postal article at the top of the stack by the camera 8, and a postal address is recognized by the monitoring and control unit 13. The image of the stack of mailpieces 3 is displayed on the screen with an arrow visually showing the operator the insertion position at which said postal article is to be inserted into the stack, a number designating the number of mailpieces to be scanned through starting from the head of the sequence in order to reach said insertion position.

Starting from the end 5A of the merge table, the operator scans through the mailpieces 3 and forms the insertion slot 7 as a V-shaped slot so as to insert the current postal article into it.

By detecting a key press being made by the operator, the monitoring and control unit 13 then displays on the screen 10 a new image of the stack of mailpieces with a new marker for the new current postal article that is under the camera 8.

For this new current postal article, the operator proceeds as indicated above, and so on for all of the postal articles in the stack under the camera 8.

What is claimed is:

1. Apparatus for assisting in merging postal articles with a stack of mailpieces that have already been sorted into a certain sequence, said apparatus comprising:
   a merge table extending longitudinally between two ends and suitable for storing the stack of mailpieces on edge between said ends,
   a first camera suitable for forming a digital image of a current postal article to be merged with the stack of mailpieces,
   a monitoring and control unit with a display screen and suitable for displaying on the screen an indication representative of an insertion position at which the current postal article is to be inserted into the stack of mailpieces, wherein the display screen is disposed at an end of the merge table at a head of the sequence of mailpieces in a stack and on edge, so that the longitudinally extending stack of mailpieces lies within a field of vision of an operator facing the screen, and
   a second camera that is suitable for forming a digital image of the stack of mailpieces seen from a viewing angle that is the same as a viewing angle from which the operator sees it, and wherein the monitoring and control unit is arranged to display on the display screen the image of the stack of mailpieces that is formed by said second camera, and a marker designating said insertion position on the image of the stack of mailpieces.

2. Apparatus according to claim 1, wherein said second camera is fastened to said end of the merge table facing the screen and behind the operator in such a manner as to form the digital image of the stack of mailpieces from the same viewing angle as the viewing angle from which the operator sees said stack and without having the operator in its field of vision.

3. Apparatus according to claim 2, wherein said first camera, which is suitable for forming digital images of the current postal article to be merged is mounted at some height on a support fastened to a longitudinal side of the merge table.

4. Apparatus according to claim 1, wherein said second camera is integrated into augmented reality glasses designed to be worn by the operator.

5. Apparatus according to claim 4, wherein said first camera, which is suitable for forming digital images of the current postal article to be merged, is mounted at some height on a support fastened to a longitudinal side of the merge table.

6. Apparatus according to claim 1, wherein said first camera, which is suitable for forming digital images of the current postal article to be merged, is mounted at some height on a support fastened to a longitudinal side of the merge table.

* * * * *